United States Patent
Umezawa

(10) Patent No.: US 8,392,733 B2
(45) Date of Patent: Mar. 5, 2013

(54) NETWORK APPARATUS

(75) Inventor: Yasushi Umezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 438 days.

(21) Appl. No.: 12/647,237

(22) Filed: Dec. 24, 2009

(65) Prior Publication Data

US 2010/0169682 A1 Jul. 1, 2010

(30) Foreign Application Priority Data

Dec. 26, 2008 (JP) ................................. 2008-331949

(51) Int. Cl.
G06F 1/26 (2006.01)

(52) U.S. Cl. ........................................ 713/320; 713/300

(58) Field of Classification Search .................. 713/300, 713/320

See application file for complete search history.

(56) References Cited

U.S. PATENT DOCUMENTS

| | | | | |
|---|---|---|---|---|
| 4,736,362 A * | 4/1988 | Clark et al. | ................... | 370/363 |
| 5,602,848 A * | 2/1997 | Andrews et al. | ............. | 370/465 |
| 5,717,871 A * | 2/1998 | Hsieh et al. | ................... | 710/317 |
| 5,748,925 A * | 5/1998 | Waclawsky et al. | .......... | 710/316 |
| 7,500,162 B2 * | 3/2009 | Smith | ........................... | 714/725 |
| 7,558,976 B2 * | 7/2009 | Fung | ............................. | 713/320 |
| 7,843,945 B2 * | 11/2010 | Luculli | ..................... | 370/395.6 |
| 2010/0046543 A1 * | 2/2010 | Parnaby | ........................ | 370/465 |

FOREIGN PATENT DOCUMENTS

| | | |
|---|---|---|
| JP | 2002-247065 | 8/2002 |
| JP | 2003-69607 | 3/2003 |
| JP | 2007-228491 | 9/2007 |
| JP | 2007-243790 | 9/2007 |

* cited by examiner

Primary Examiner — Kim Huynh
Assistant Examiner — Zahid Choudhury
(74) Attorney, Agent, or Firm — Staas & Halsey LLP

(57) ABSTRACT

An apparatus includes a switching unit to output data input from an input unit to an output unit to which the data is to be output, and an input control unit, wherein input units included in a same group among a plurality of input units each have a buffer to store data received from another apparatus; a multiplexer connected to the buffer and to a buffer in another input unit in the same group, and capable of selectively outputting data; and an input data processing portion connected to the multiplexer and performing specific input data processing on data input from the multiplexer and outputting data after the specific input data processing to the switching unit, wherein the input control unit controls a data output selection of the multiplexer and controls supply of power or supply of a clock signal to the multiplexer and the input data processing portion.

5 Claims, 10 Drawing Sheets

FIG. 4

| PORT NUMBER | OUTPUT PORT INFORMATION |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

NETWORK APPARATUS

CROSS-REFERENCE TO RELATED APPLICATIONS

This application is based upon and claims the benefit of priority of the prior Japanese Patent Application No. 2008-331949, filed on Dec. 26, 2008, the entire contents of which are incorporated herein by reference.

FIELD

The present technology relates to technologies for saving power in a network apparatus.

BACKGROUND

In recent years, the increases in the number of apparatuses connected to networks and increases in the level of performance of the apparatuses have rapidly increased the amount of traffic over the networks leading to the problem of increases in power consumption. Particularly, a network apparatus such as a switch or a router is generally kept working without being powered off, irrespective of the condition of the traffic over a network, resulting in low usage efficiency of power. The transmission rate between a network apparatus and another apparatus depends on the communication standard supported by both of the apparatuses. Thus, even when the actual transmission rate between the apparatuses is lower than a maximum transmission rate supported by the network apparatus, the network apparatus operates so as to support the maximum transmission rate, using power unnecessarily.

In the past, there has been a technology, for example, for adjusting the frequency of a clock signal to be supplied to a circuit in accordance with the amount of data actually passing through a network apparatus, for power saving (as in JP-A-2003-69607, JP-A-2007-228491, and JP-A-2002-247065, for example). There has been another technology, for example, for bundling a plurality of physical lines among switch apparatuses into one logical line and controlling the powering on or off of a port in accordance with the actual data transmission rate, whereby the line transmission rate of the logical line can be changed, and the power consumption can be reduced (as in JP-A-2007-243790). The network apparatuses in the past have had a problem that it is difficult to reduce the power consumption sufficiently or that only a special logical connection can reduce the power consumption.

SUMMARY

According to an aspect of the invention, an apparatus includes a plurality of input units; a plurality of output units; a switching unit to output data input from an input unit to an output unit relating to a destination apparatus to which the data is to be output; and an input control unit, wherein input units included in a same group among the plurality of input units each have a buffer to store data received from another apparatus;

a multiplexer connected to the buffer and to a buffer in another input unit in the same group, and capable of selectively outputting data input from the buffer and from the buffer in the another input unit in the same group; and an input data processing portion connected to the multiplexer, the input data processing portion performing specific input data processing on data input from the multiplexer and outputting data after the specific input data processing to the switching unit, wherein the input control unit controls a data output selection of the multiplexer and controls supply of power or supply of a clock signal to the multiplexer and the input data processing portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram depicting an example of an output port information table.

DESCRIPTION OF EMBODIMENTS

Figure 1:
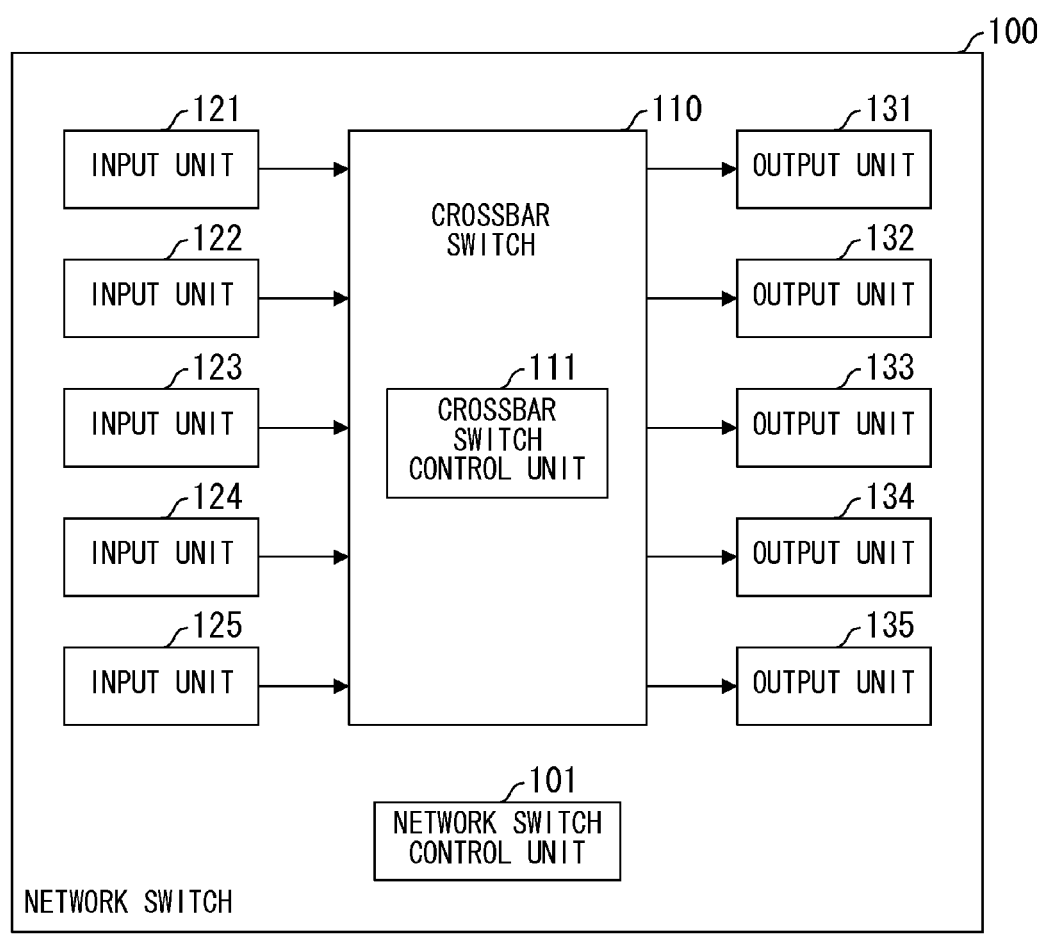
FIG. 1 is a configuration diagram of a network switch according to an embodiment of the present technology.

FIG. 1 depicts a configuration of a network switch according to an embodiment of the present technology. For example, a network switch 100, which is a layer-2 switch, may be connected from a port, not depicted, through a LAN (Local Area Network) cable and a connector to a computer, not depicted. The network switch 100 includes input units 121 to 125, output units 131 to 135, a crossbar switch 110, and a network switch control unit 101. The crossbar switch 110 has a crossbar switch control unit 111. The input units 121 to 125 and output units 131 to 135 are connected to the crossbar switch 110. Notably, FIG. 1 illustrates the input units 121 to 125 and the output units 131 to 135 as if they are separately arranged, for easy understanding of the description. However, in reality, like a general switch, the input units 121 to 125 and the output units 131 to 135 are paired respectively in arrangement. Notably, only five input units and output units are depicted, but the numbers are not limited.

An operation by a network switch 100 depicted in FIG. 1 will be described. Each of the input units 121 to 125 has an input port as will be described later, and performs processing of analyzing a frame received through the input port, for example, and outputs the frame to the crossbar switch 110. The crossbar switch 110 outputs the received frame to one of the output units 131 to 135 having an output port to which the frame is destined. The crossbar switch control unit 111 controls the switching in the crossbar switch 110 and adds output port information, which will be described later, to the frame. The output units 131 to 135 perform processing for transmitting, from the output ports, the frame received from the crossbar switch 110, as will be described later. The network switch control unit 101 is connected to and controls input control portions in the input units 121 to 125 and output control portions in the output units 131 to 135, and the crossbar switch control unit 111, though not depicted.

Figure 2:
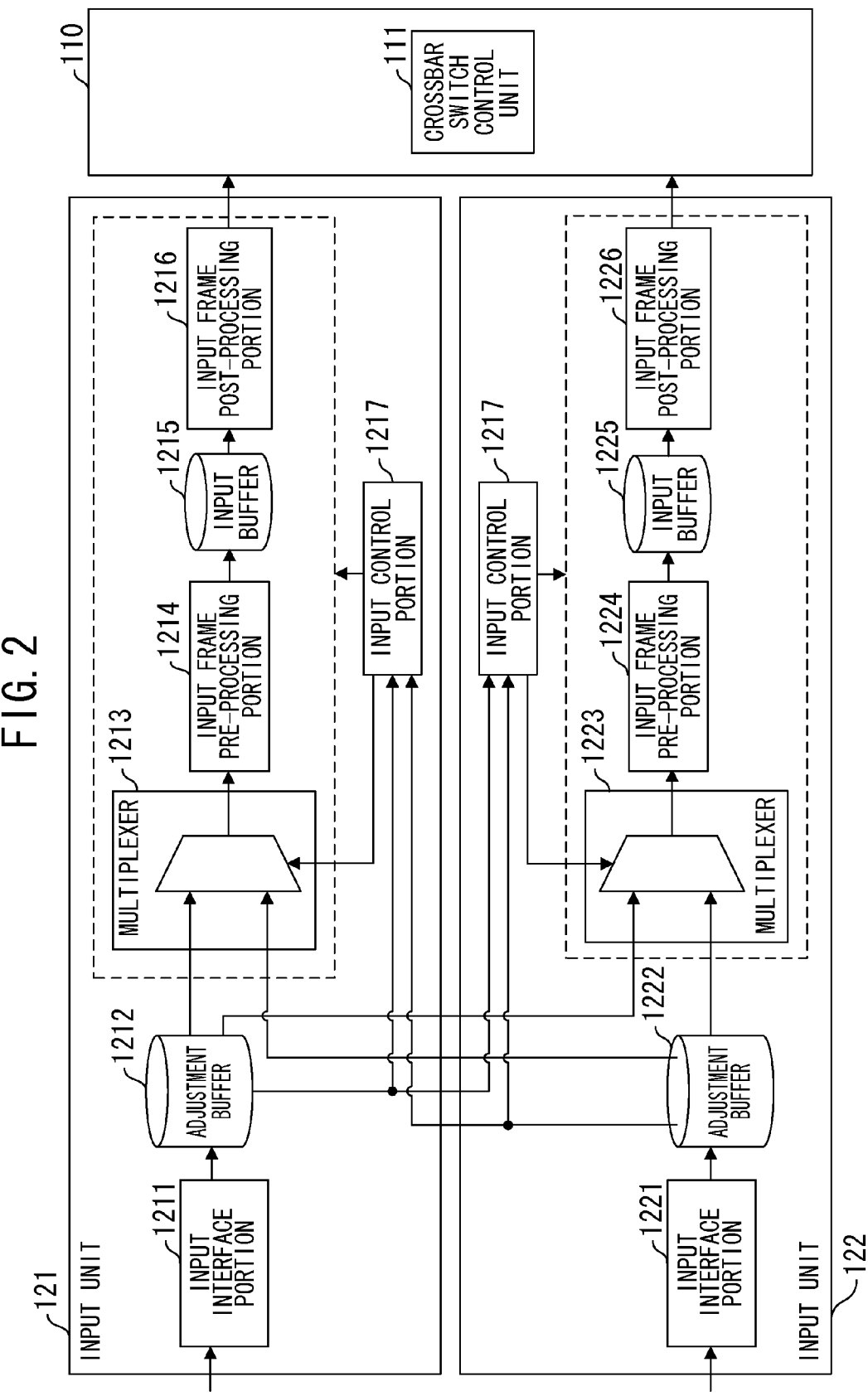
FIG. 2 is a first configuration diagram of input units according to the embodiment.

FIG. 2 depicts a first configuration of the input units 121 and 122. For easy description and for illustration purposes, the input units 121 and 122 are given. However, the number of input units to be applied and the positional relationship among the input units are not limited. Therefore, the configuration is applicable to arbitrary combinations, or 2 or more input units may be applicable to the configuration while the others may not.

First of all, the input unit 121 will be described. The unit 121 has an input interface portion 1211, an adjustment buffer 1212, a multiplexer 1213, an input frame pre-processing portion 1214, an input buffer 1215, an input frame post-processing portion 1216, and an input control portion 1217. Unlike general switches, the adjustment buffer 1212 and the multiplexer 1213 are provided according to this embodiment.

The input interface portion 1211 is connected to the adjustment buffer 1212. The adjustment buffer 1212 is connected to the input side of the multiplexer 1213. An adjustment buffer 1222 in the input unit 122 also is connected to the input side of the multiplexer 1213. Adjustment buffers in other associated input units if any also connect to the input side of the multiplexer 1213.

The output side of the multiplexer 1213 is connected to the input frame pre-processing portion 1214. The input frame pre-processing portion 1214 is connected to the input buffer 1215. The input buffer 1215 is connected to the input frame post-processing portion 1216. The input frame post-processing portion 1216 is connected to the crossbar switch 110. The input control portion 1217 is connected to the adjustment buffer 1212 and the adjustment buffers in the input units 122 to 125. However, the connection relationships with the adjustment buffers in the input units 123 to 125 are not depicted. The input control portion 1217 is connected to the multiplexer 1213, input frame pre-processing portion 1214, input buffer 1215, and input frame post-processing portion 1216 included in the area enclosed by the dashed line in the input unit 121.

Next, the functions of the function blocks in the input unit 121 will be described. The input interface portion 1211 receives data as a signal through a cable and a connector from an input port, not depicted. The input interface portion 1211 performs processing including transformation to a serial bit stream, parallel conversion, and frame decoding on the received electrical or optical signal. Then, the frame corresponding to the received signal is stored in the adjustment buffer 1212.

Notably, the input interface portion 1211 may support various communication standards such as 100 BASE-TX and 1000 BASE-SX. Even when the input unit 121 supports a high transmission rate (such as 10 Gbps), the input unit 121 operates based on the transmission rate (1 Gbps) if the actual transmission rate is low (such as 1 Gbps). According to this embodiment, for easy illustration, the input interface portions 1211 and 1221 and output interface portions 1316 and 1326 are depicted as if they exist separately. However, in reality, the input and output interface portions perform input and output of data through one port together.

The adjustment buffer 1212 temporarily stores the frame to be output to the multiplexer 1213, and the timing for outputting the frame is adjusted therein.

The multiplexer 1213 receives the frames temporarily stored in the adjustment buffer 1212 and the adjustment buffers in other associated input units. The multiplexer 1213 then outputs the frames selectively to the input frame pre-processing portion 1214.

The input frame pre-processing portion 1214 analyzes the frames output from the multiplexer 1213 to check for an error.

The input buffer 1215 temporarily stores the frames processed by the input frame pre-processing portion 1214.

The input frame post-processing portion 1216 performs processing of reading out frames stored in the input buffer 1215, analyzing the frames, and acquiring the destination port numbers.

The input control portion 1217 controls the multiplexer 1213 to select the frame to be output from the multiplexer 1213. While the input control portion 1217 normally sets the multiplexer 1213 to only output a frame received by the input unit 121, the input control portion 1217 may set the multiplexer 1213 to output a frame received by another input unit, as will be described later. The input control portion 1217 controls the supply of power or of a clock signal to the multiplexer 1213, the input frame pre-processing portion 1214, the input buffer 1215, and the input frame post-processing portion 1216 included in the area enclosed by the dashed line in FIG. 2.

The input unit 122, like the input unit 121, has an input interface portion 1221, an adjustment buffer 1222, a multiplexer 1223, an input frame pre-processing portion 1224, an input buffer 1225, an input frame post-processing portion 1226, and an input control portion 1227. The connection relationship among the portions and their functions are similar to those in the input unit 121, and the description will be omitted.

The operations by the input units 121 and 122 depicted in FIG. 2 will be described. The following descriptions assume the case where the inputs units 121 and 122 operate in a similar mode (which will be called a "normal mode" hereinafter) to that of a general switch, and the case where they operate under the state that the supply of power or of a clock signal to some of the circuits in the input unit is stopped (which will be called a "power-saving mode" hereinafter).

First of all, an operation in the normal mode will be described. In the normal mode, the input control portion 1217 controls the setting of the multiplexer 1213 so that the multiplexer 1213 may only output a frame received by the input unit 121. The input control portion 1227 also controls the setting of the multiplexer 1223 so that the multiplexer 1223 may only output a frame received by the input unit 122.

In this case, a frame received by the input unit 121 is temporarily stored in the adjustment buffer 1212 and is input to the input side of the multiplexer 1213. Since the multiplexer 1213 is set so as to only output a frame received by the input unit 121, the frame is output from the output side of the multiplexer 1213 to the input frame pre-processing portion 1214. The frame having undergone the processing in the input frame pre-processing portion 1214 is temporarily stored in the input buffer 1215. Then, after the frame undergoes the processing by the input frame post-processing portion 1216, the frame is output to the crossbar switch 110. A frame received by the input unit 122 also undergoes the same process and is output to the crossbar switch 110. Notably, in the normal mode, the adjustment buffer may be bypassed.

Next, operations in the power-saving mode will be described. Operating the input units in the power-saving mode allows the reduction of power consumption more than in the normal mode. For example, the input units 121 and 122 provide support up to a maximum transmission rate of 10 Gbps. However, when the input ports receive the connection by, for example, a computer that only supports a transmission rate as low as 100 Mbps or 1 Gbps, the power-saving mode may be selected.

In the power-saving mode, the input control portion 1217 controls the setting of the multiplexer 1213 to output not only a frame received by the input unit 121 but also a frame received by the input unit 122. (Like the input unit 121, an input unit that also receives a frame from another input unit will be called a "common input unit", hereinafter). The input control portion 1227 stops the supply of power or a clock signal to the portions enclosed by the dashed line within the input unit 122. Here, the supply of power or a clock signal to the multiplexer 1223, input frame pre-processing portion 1224, input buffer 1225, and input frame post-processing portion 1226 is stopped. (An input unit having the supply of power or a clock signal for some of the circuits stopped will be called a "stopped input unit", hereinafter).

In this case, the frame received by the input unit 121 being a common input unit undergoes the same process as in the normal mode and is output to the crossbar switch 110. On the other hand, the frame received by the input unit 122 being a stopped input unit is not input to the multiplexer 1223 because the multiplexer 1223 is not operating. However, the multiplexer 1213 is connected to the adjustment buffer 1222, and is set to also output the frame received by the input unit 122 being the stop input unit. Thus, the frame received by the input unit 122 being the stopped input unit is input to the multiplexer 1213 and is output to the input frame pre-processing portion 1214. The frame received by the input unit 121 being the common input unit undergoes the same process and is output to the crossbar switch 110.

In the above description, the input unit 122 is the stopped input unit and the input unit 121 is the common input unit; however, the input unit 121 may be the stopped input unit, and the input unit 122 may be the common input unit.

In this way, since, in the power-saving mode, power or a clock signal is not supplied to some of the input units, the power consumption may be reduced. The processing capability by the input units may be used effectively.

Figure 3:
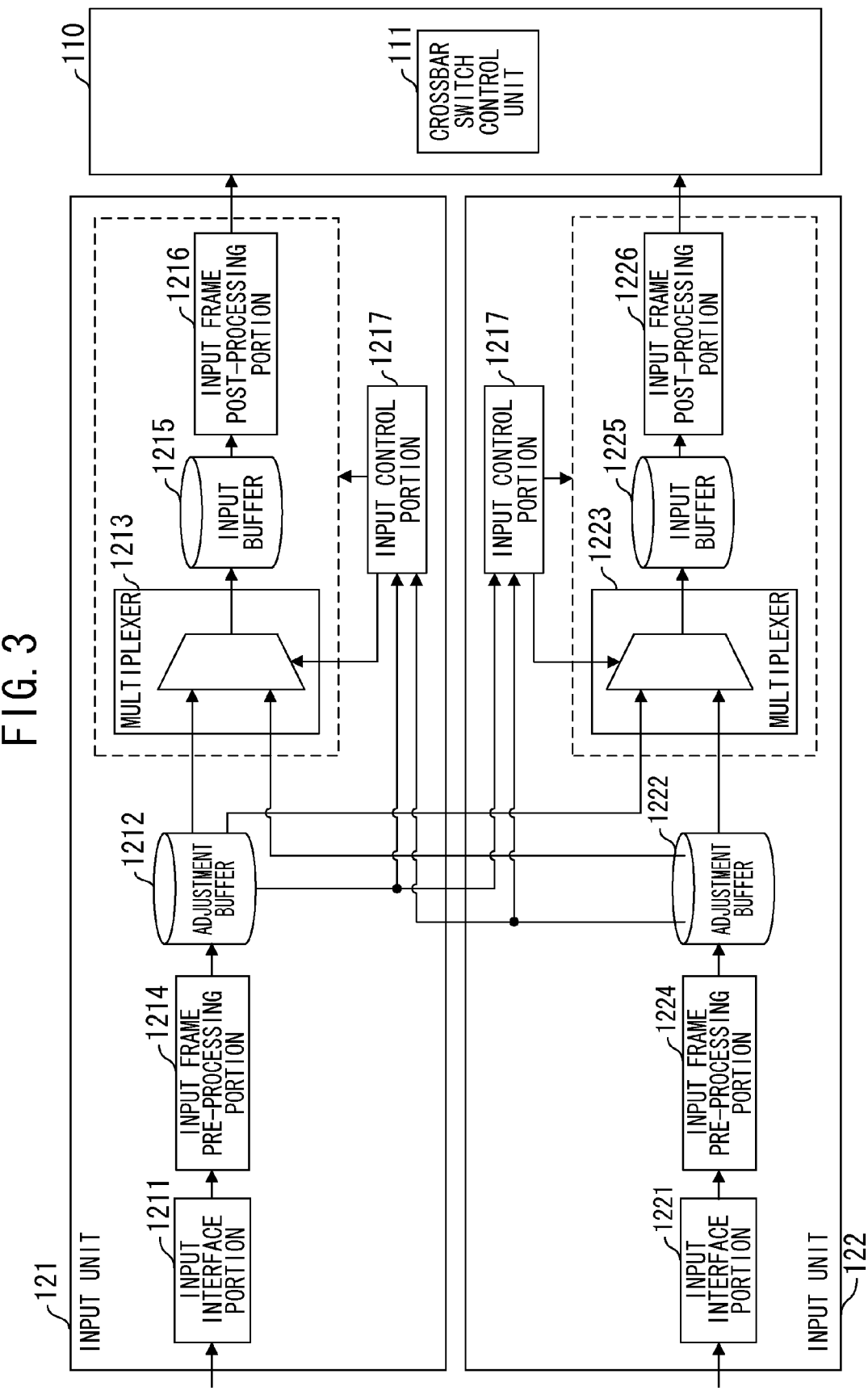
FIG. 3 is a second configuration diagram of input units according to the embodiment.

FIG. 3 depicts a second configuration of the input units 121 and 122. The input units 121 and 122 are described as examples for easy description, like FIG. 2, but the number of input units to be applied and/or the positional relationship are not limited thereto. Therefore, the configuration is applicable to arbitrary combinations, or two or more input units may be applicable to the configuration while the others may not.

First of all, the input unit 121 will be described. The input unit 121 includes, like in FIG. 2, an input interface portion 1211, an adjustment buffer 1212, a multiplexer 1213, an input frame pre-processing portion 1214, an input buffer 1215, an input frame post-processing portion 1216, and an input control portion 1217. The input unit 121 in FIG. 3 includes the adjustment buffer 1212 and the multiplexer 1213, unlike a general switch.

The input interface portion 1211 is connected to the input frame pre-processing portion 1214. The input frame pre-processing portion 1214 is connected to the adjustment buffer 1212. The adjustment buffer 1212 is connected to the input side of the multiplexer 1213. The adjustment buffer 1222 in the input unit 122 also is connected to the input side of the multiplexer 1213. The adjustment buffers in other associated input units, if any, are also connected to the input side of the multiplexer 1213.

The output side of the multiplexer 1213 is connected to the input buffer 1215. The input buffer 1215 is connected to the input frame post-processing portion 1216. The input frame post-processing portion 1216 is connected to the crossbar switch 110. The input control portion 1217 is connected to the adjustment buffer 1212 and the adjustment buffers in the input units 122 to 125. However, the connection relationships with the adjustment buffers in the input units 123 to 125 are not depicted. The input control portion 1217 is connected to the multiplexer 1213, the input buffer 1215, and the input frame post-processing portion 1216 included in the area enclosed by the dashed line in the input unit 121.

In this way, FIG. 3 depicts the configuration having the input frame pre-processing portion 1214 between the input interface portion 1211 and the adjustment buffer 1212. The input control portion 1217 is connected to the multiplexer 1213, the input buffer 1215, and the input frame post-processing portion 1216 but is not connected to the input frame pre-processing portion 1214.

Though the functions of the function blocks in the input unit 121 in FIG. 3 have some differences in the data input/output relationships from the functions of the function blocks depicted in FIG. 2, they are similar. Therefore, the description will be omitted.

Notably, the input unit 122 also includes, like the input unit 121, an input interface portion 1221, an adjustment buffer 1222, a multiplexer 1223, an input frame pre-processing portion 1224, an input buffer 1225, an input frame post-processing portion 1226, and an input control portion 1227. Since the connection relationship among the various portions and their functions are similar to those in the input unit 121, the description will be omitted.

How the input units 121 and 122 in FIG. 3 operate in the normal mode and in the power-saving mode will be described briefly below.

The normal mode will be described first. The settings defined by the input control portion 1217 and 1227 are the same as those in the case in FIG. 2. Briefly, the input control portion 1217 controls the setting of the multiplexer 1213 so that the multiplexer 1213 may only output a frame received by the input unit 121. The input control portion 1227 also controls the setting of the multiplexer 1223 such that the multiplexer 1223 may only output a frame received by the input unit 122.

In this case, a frame received by the input unit 121 undergoes the processing in the input frame pre-processing portion 1214, is then temporarily stored in the adjustment buffer 1212, and is input to the input side of the multiplexer 1213. Since the multiplexer 1213 is set so as to only output a frame received by the input unit 121, the frame is output from the output side of the multiplexer 1213 and is temporarily stored in the input buffer 1215. Then, after the frame undergoes the processing by the input frame post-processing portion 1216, the frame is output to the crossbar switch 110. A frame received by the input unit 122 also undergoes the same process and is output to the crossbar switch 110. Notably, in the normal mode, the adjustment buffer may be bypassed.

Next, the power-saving mode will be described. The settings defined by the input control portions 1217 and 1227 are basically the same as those in the case in FIG. 2. Briefly, in the power-saving mode, the input control portion 1217 controls the setting of the multiplexer 1213 so as to output not only the frames received by the input unit 121 but also the frames received by the input unit 122. The input control portion 1227 stops the supply of power or a clock signal to the portions enclosed by the dashed line within the input unit 122. However, in the case in FIG. 3, the supply of power or a clock signal to the multiplexer 1223, input buffer 1225, and input frame post-processing portion 1226 is stopped while the supply of power or a clock signal to the input frame pre-processing portion 1224 is maintained. Thus, the input unit 121 is handled as a common input unit while the input unit 122 is handled as a stopped input unit.

In this case, the frame received by the input unit 121 being the common input unit undergoes the same process as in the normal mode and is output to the crossbar switch 110. On the other hand, the frame received by the input unit 122 being the stopped input unit is not input to the multiplexer 1223 because the multiplexer 1223 is not operating. However, the multiplexer 1213 is connected to the adjustment buffer 1222, and is also set to output the frame received by the input unit 122 being the stopped input unit. Thus, the frame received by the input unit 122 being the stopped input unit is input to the multiplexer 1213 and is then output to the input buffer 1215. Then, the frame undergoes the processing in the input frame post-processing portion 1216 and is output to the crossbar switch 110.

In the above description, the input unit 122 is the stopped input unit and the input unit 121 is the common input unit; however, the input unit 121 may be the stopped input unit, and the input unit 122 may be the common input unit.

In this way, power-saving is possible even in a configuration having the adjustment buffer and multiplexer between the input frame pre-processing portion and the input buffer. The configuration may have the multiplexer between the input buffer and the input frame post-processing portion, and the adjustment buffer may not be used. In this case, power saving is achieved by stopping the supply of power or a clock signal to the multiplexer and input frame post-processing portion. According to the comparison between FIG. 2 and FIG. 3, providing the adjustment buffer and multiplexer near the input port allows stopping the supply of power or a clock signal to more circuits, resulting in a higher power-saving effect.

The operation for switching the crossbar switch 110 having received a frame from one of the input units will be described below. The crossbar switch control unit 111 first identifies the output port information corresponding to the port number being the destination of the frame, from an output port information table, for example, stored in a storage device. The output port information table will be described in detail later. Next, the crossbar switch control unit 111 adds the identified output port information to the frame. The crossbar switch 110 then outputs the frame having the output port information to the output unit having the output port that is the destination of the frame. The multiplexer in the output unit outputs the frame only when the output port information added to the frame indicates that the frame is destined to its port, as will be described later. Thus, even when a frame destined to another port is input thereto, the frame is not output to its port.

In the power-saving mode, the supply of power or a clock signal to some of the circuits in the output unit is stopped, as will be described later. (The output unit having the supply of power or clock signal to some of the circuits is stopped will be called a "stopped output unit" hereinafter). In this case, since some of the circuits in the stop output unit no longer operate, the crossbar switch control unit 111 controls the crossbar switch 110 so as to output a frame destined to the output port of the stopped output unit to another proper output unit. (The output unit that receives a frame from the stopped output unit will be called a "common output unit", hereinafter). Thus, a frame destined to the output port of the stopped output unit is output to the common output unit. However, the adoption of the configuration of the output unit as will be described later allows the frame to be properly output to the output port of the stopped output unit, instead of the output port of the common output unit.

FIG. 4 depicts an example of the output port information table. In the example in FIG. 4, the output port information table contains a column of port numbers and a column of the output port information. Here, the output port information is expressed in binary data. As in the example in FIG. 4, if the number of ports is 16, for example, and if the output port information is 4-bit data, the output port information allows unique identification of the output port. More ports may be handled by an increased bit count of the output port information. Fewer ports may be handled by a decreased bit count. For example, if a frame destined to an output port A is output to the output unit having the output port B in the power-saving mode, the frame may be correctly output to the output port A by the addition of the output port information on the output port A to the frame.

Figure 5:
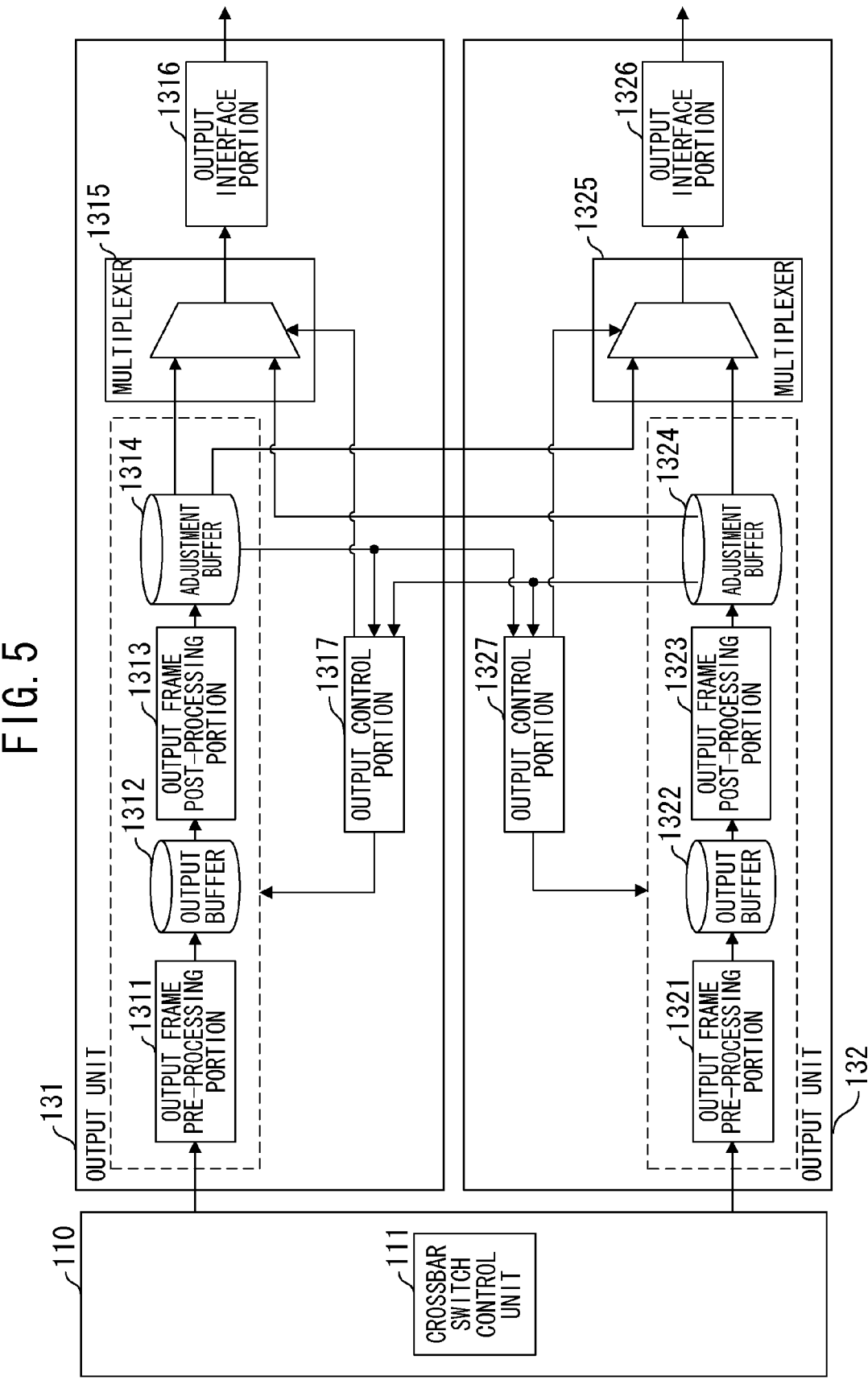
FIG. 5 is a first configuration diagram of output units according to the embodiment.

FIG. 5 depicts a first configuration of the output units 131 and 132. The output units 131 and 132 are used as examples for easy description, but the number of output units to be applied and/or the positional relationship among the output units are not limited thereto. Therefore, the configuration is applicable to arbitrary combinations, or two or more input units may be applicable to the configuration while others may not.

First of all, the output unit 131 will be described. The output unit 131 includes an output frame pre-processing portion 1311, an output buffer 1312, an output frame post-processing portion 1313, an adjustment buffer 1314, a multiplexer 1315, an output interface portion 1316, and an output control portion 1317. This embodiment includes the adjustment buffer 1314 and the multiplexer 1315, unlike a general switch.

The crossbar switch 110 is connected to the output frame pre-processing portion 1311. The output frame pre-processing portion 1311 is connected to the output buffer 1312. The output buffer 1312 is connected to the output frame post-processing portion 1313. The output frame post-processing portion 1313 is connected to the adjustment buffer 1314. The adjustment buffer 1314 is connected to the input side of the multiplexer 1315. The adjustment buffer 1324 in the output unit 132 also is connected to the input side of the multiplexer 1315. The adjustment buffers in other associated output units, if any, also connect to the input side of the multiplexer 1315.

The output side of the multiplexer 1315 is connected to the output interface portion 1316. The output interface portion 1316 is connected through a connector and a cable to a computer, not depicted, for example. The output control portion 1317 is connected to the adjustment buffer 1314 and adjustment buffers in the output units 132 to 135. However, the connection relationships with the adjustment buffers in the output units 133 to 135 are not depicted. The output control portion 1317 is connected to the multiplexer 1315 and further is connected to the output frame pre-processing portion 1311, output buffer 1312, output frame post-processing portion 1313 and adjustment buffer 1314 included in the area enclosed by the dashed line in the output unit 131.

Next, the functions of the function blocks in the output unit 131 will be described. The output frame pre-processing portion 1311 performs processing of analyzing a frame and adjusting the order of the output of frames.

The output buffer 1312 temporarily stores a frame having undergone the processing by the output frame pre-processing portion 1311.

The output frame post-processing portion 1313 performs the processing of adding information for checking an error in a frame.

The adjustment buffer 1314 temporarily stores a frame to be input to the multiplexer 1315 and adjusts the timing for outputting the frame.

The multiplexer 1315 receives the input of a frame stored in the adjustment buffer 1314 and the adjustment buffers in other associated output units. If the output port information added to the frame indicates that the frame is destined to the output port of the output unit 131, the multiplexer 1315 then outputs the input frame to the output interface portion 1316. The multiplexer 1315 may further remove the output port information added to the frame before outputting the frame, for example.

The output interface portion 1316 performs processing on the frame, including encoding, serial conversion, transformation of the serial bit streaming to an electrical or optical signal, for example. Then, the output interface portion 1316 transmits data from the output port, not depicted, through a connector and a cable.

According to this embodiment, for easy description, the input interface portion 1211 and 1221 and the output interface portion 1316 and 1326 are depicted as if they exist separately. However, in reality, the portions may perform the input and output of data through one port together. Thus, the communication standards supported by the output interface portion 1316 are as described in the description of the input interface portion 1211 in FIG. 2.

The output control portion 1317 controls the multiplexer 1315 to select a frame output from the multiplexer 1315. The output control portion 1317 controls the supply of power or a clock signal to the output frame pre-processing portion 1311, output buffer 1312, output frame post-processing portion 1313, and adjustment buffer 1314 included in the area enclosed by the dashed line in FIG. 5.

The output unit 132 also includes, like the output unit 131, an output frame pre-processing portion 1321, an output buffer 1322, an output frame post-processing portion 1323, an adjustment buffer 1324, a multiplexer 1325, an output interface portion 1326, and an output control portion 1327. The connection relationship among the portions and their functions are similar to those in the output unit 131, and the description will be omitted.

The operations by the output units 131 and 132 depicted in FIG. 5 will be described briefly. The operations in the normal mode and the operations in the power-saving mode in which the supply of power or a clock signal to some of the circuits of the output units is stopped will be described below.

First of all, the operations in the normal mode will be described. In the normal mode, the crossbar switch 110 is configured to only output to the output unit 131 a frame destined to the output port of the output unit 131. The frame to be output to the output unit 131 has output port information describing that the frame is destined to the output port of the output unit 131. Thus, the output control portion 1317 sets the multiplexer 1315 so as to only output a frame destined to the output port of the output unit 131, whereby the frame may be output to the output port of the output unit 131. Similarly, the output control portion 1327 also sets the multiplexer 1325 so as to only output a frame destined to the output port of the output unit 132.

In this case, the frame output to the output unit 131 undergoes the processing in the output frame pre-processing portion 1311 and is then temporarily stored in the output buffer 1312. The frame stored in the output buffer 1312 undergoes the processing in the output frame post-processing portion 1313 and is then temporarily stored in the adjustment buffer 1314. The frame stored in the adjustment buffer 1314 is input to the input side of the multiplexer 1315. Here, the output port information added to the frame indicates that the frame is destined to the output port of the output unit 131, and the multiplexer 1315 is set so as to only output a frame destined to the output port of the output unit 131. Thus, the frame is output from the output side of the multiplexer 1315 to the output interface portion 1316. Then, the output interface portion 1316 transmits the data through the output port, not depicted. The frame output to the output unit 132 similarly undergoes the same process and is transmitted through the output port to the destination computer, for example. Notably, in the normal mode, the adjustment buffer may be bypassed.

Next, the operations in the power-saving mode will be described. Operating the output units in the power-saving mode allows the reduction of the power consumption more than the operations in the normal mode. As described above, if the output units 131 and 132 are able to support a maximum transmission rate of 10 Gbps but the output ports thereof receives the connection of a computer that only supports a low transmission rate such as 100 Mbps or 1 Gbps, the power-saving mode may be selected.

In the power-saving mode, the multiplexer 1315 is defined by the output control portion 1317 so as to only output a frame destined to the output port of the output unit 131. On the other hand, the multiplexer 1325 is also set by the output control portion 1327 so as to only output a frame destined to the output port of the output unit 132. The output control portion 1327 stops the supply of the power or a clock signal to the area enclosed by the dashed line within the output unit 132. Here, the supply of power or a clock signal to the output frame pre-processing portion 1321, output buffer 1322, output frame post-processing portion 1323, and adjustment buffer 1324 is stopped. Thus, the output unit 131 becomes a common output unit, and the output unit 132 becomes a stopped output unit.

Notably, a frame destined to the output port of the output unit 131 being the common output unit receives output port information indicating that the frame is destined to the output port of the common output unit. After the frame is output to the output unit 131, the frame undergoes the same process as in the normal mode and is transmitted through the output port to the destination computer, for example. On the other hand, a frame destined to the output port of the output unit 132 being the stopped output unit receives output port information indicating that the frame is destined to the output port of the stop output unit. However, the frame is not output to the output unit 132 being the stopped output unit and is output to the output unit 131 being the common output unit.

After the frame destined to the output port of the output unit 132 is output to the output unit 131 being the common output unit and before the frame is stored to the adjustment buffer 1314, the frame is processed by the same process as that on the frame destined to the output port of the output unit 131. However, since the multiplexer 1315 is set to only output a frame destined to the output port of the output unit 131, a frame with the output port information indicating that the frame is destined to the output port of the output unit 132 is not output from the multiplexer 1315. On the other hand, the adjustment buffer 1314 is connected to the multiplexer 1325, and the multiplexer 1325 is set to only output a frame destined to the output port of the output unit 132. Thus, a frame with the output port information indicating that the frame is destined to the output port of the output unit 132 is output from the multiplexer 1325. Then, the output interface portion 1326 transmits the frame through the output port to the destination computer, for example. In this way, the frame is properly output to the destination port.

In the above operations, the output unit 131 is described as the common output unit and the output unit 132 is described as the stopped output unit; however, the output unit 131 may be the stopped output unit, and the output unit 132 may be the common output unit.

In this way, since, in the power-saving mode, power or a clock signal is not supplied to an area of the output units, the power consumption may be reduced. The processing capability by the output units may be used effectively.

Figure 6:
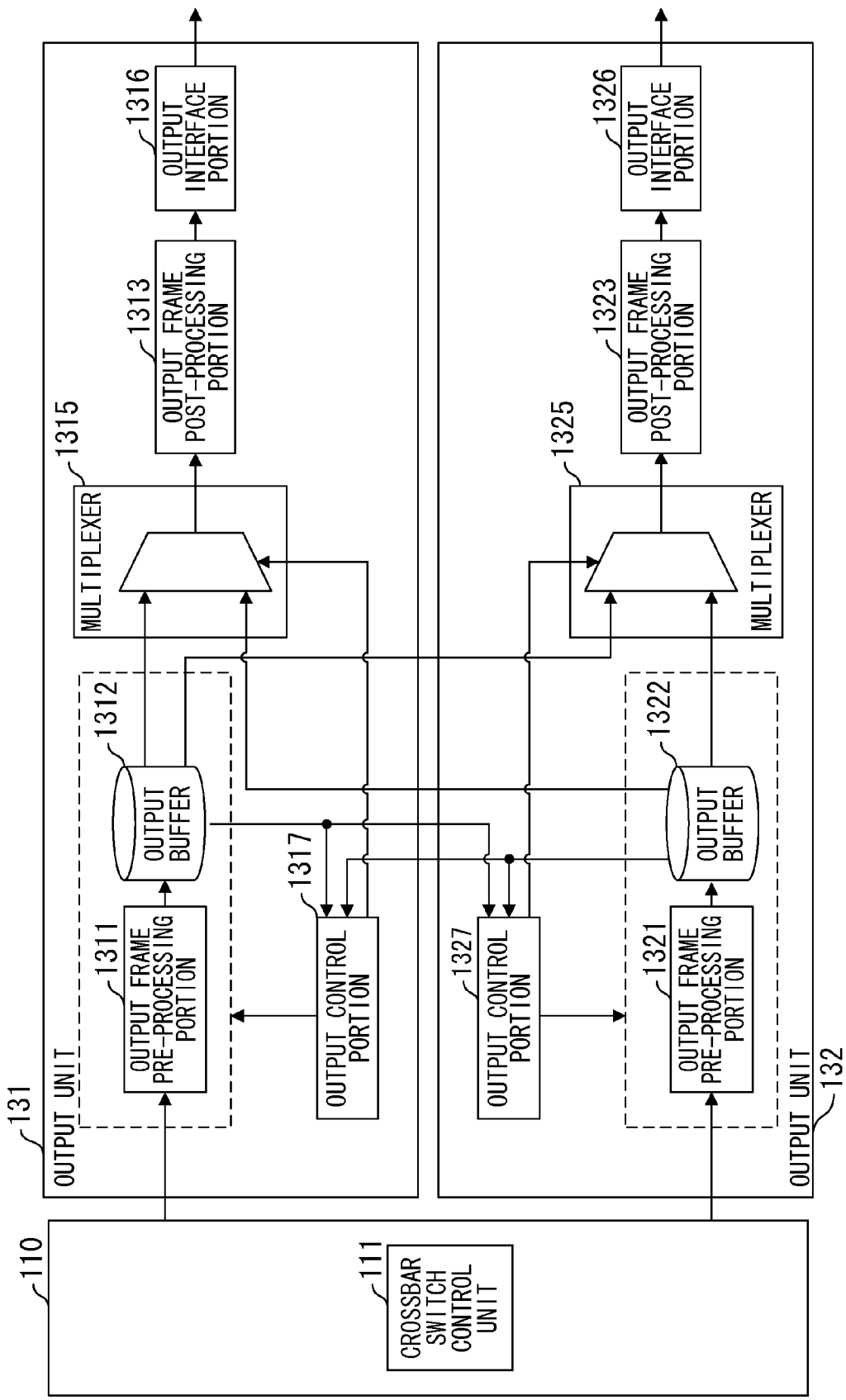
FIG. 6 is a second configuration diagram of output units according to the embodiment.

FIG. 6 depicts a second configuration of the output units 131 and 132. The output units 131 and 132 are described for easy description and for illustration purposes, like FIG. 5, but the number of input units to be applied and/or the positional relationship are not limited thereto. Therefore, the configuration is applicable to arbitrary combinations, or two or more input units may be applicable to the configuration while others may not.

First of all, the output unit 131 will be described. The output unit 131 includes an output frame pre-processing portion 1311, an output buffer 1312, a multiplexer 1315, an output frame post-processing portion 1313, an output interface portion 1316, and an output control portion 1317. Like the first configuration, the second configuration also includes the multiplexer 1315. However, the adjustment buffer 1314 is not provided therein.

The crossbar switch 110 is connected to the output frame pre-processing portion 1311. The output frame pre-processing portion 1311 is connected to the output buffer 1312. The output buffer 1312 is connected to the input side of the multiplexer 1315. The output buffer 1322 in the output unit 132 also is connected to the input side of the multiplexer 1315. The output buffers in other associated output units if any are also connected to the input side of the multiplexer 1315.

The output side of the multiplexer 1315 is connected to the output frame post-processing portion 1313. The output frame post-processing portion 1313 is connected to the output interface portion 1316. The output interface portion 1316 is connected through a connector and a cable to a computer, for example, not depicted. The output control portion 1317 is connected to the output buffer 1312 and the output buffers in the output units 132 to 135. However, the connection relationships with the output buffers in the output units 133 to 135 are not depicted. The output control portion 1317 is connected to the multiplexer 1315 and also is connected to the output frame pre-processing portion 1311 and output buffers 1312 included in the area enclosed by the dashed line in the output unit 131.

In this way, in the case in FIG. 6, the configuration has the multiplexer 1315 between the output buffer 1312 and the output frame post-processing portion 1313. The output control portion 1317 is connected to the output frame pre-processing portion 1311 and output buffer 1312 but is not connected to the output frame post-processing portion 1313.

Although the data input/output relationships are different, the functions of the function blocks in the output unit 131 of FIG. 6 are the same as the functions of the function blocks described in FIG. 5, and so detailed descriptions will be omitted.

The output unit 132 also, like the output unit 131, includes an output frame pre-processing portion 1321, an output buffer 1322, a multiplexer 1325, an output frame post-processing portion 1323, an output interface portion 1326, and an output control portion 1327. Since the connection relationship among the portions and their functions are also similar to those in the output unit 131, the description will be omitted.

How the output units 131 and 132 in FIG. 6 operate in the normal mode and in the power-saving mode will be described briefly below.

The normal mode will first be described. In the normal mode, the crossbar switch 110 is configured to only output to the output unit 131 a frame destined to the output port of the output unit 131. The frame to be output to the output unit 131 has output port information indicating that the frame is destined to the output port of the output unit 131. Thus, the output control portion 1317 controls the setting of the multiplexer 1315 so as to only output a frame destined to the output port of the output unit 131. Similarly, the output control portion 1327 also controls the setting of the multiplexer 1325 so as to only output a frame destined to the output port of the output unit 132. The settings are the same as the case in FIG. 5.

Notably, after the frame output to the output unit 131 undergoes the processing in the output frame pre-processing portion 1311, the frame is temporarily stored in the output buffer 1312. The frame stored in the output buffer 1312 is input to the input side of the multiplexer 1315. Here, the output port information added to the frame indicates that the frame is destined to the output port of the output unit 131, and the multiplexer 1315 is set so as to only output a frame destined to the output port of the output unit 131. Thus, the frame is output from the output side of the multiplexer 1315 to the output frame post-processing portion 1313. Then, after the frame undergoes the processing in the output frame post-processing portion 1313, the frame is transmitted by the output interface portion 1316 through the output port, not depicted, to the destination computer, for example. The frame output to the output unit 132 also undergoes the same process and is transmitted through the output port to the destination computer, for example.

Next, the operation in the power-saving mode will be described. Also in the power-saving mode, the multiplexer 1315 is set by the output control portion 1317 so as to only output a frame destined to the output port of the output unit 131. On the other hand, the multiplexer 1325 is also set by the output control portion 1327 so as to only output a frame destined to the output port of the output unit 132. The output control portion 1327 stops the supply of power or a clock signal to the area enclosed by the dashed line within the output unit 132. Here, unlike the case in FIG. 5, while the supply of power or a clock signal to the output frame pre-processing portion 1321 and output buffer 1322 is stopped, the supply of power or a clock signal to the output frame post-processing portion 1323 is maintained. In this way, the output unit 131 is handled as the common output unit, and the output unit 132 is handled as the stopped output unit.

In this case, a frame destined to the output port of the output unit 131 being the common output unit has output port information indicating that the frame is destined to the output port of the common output unit. Then, after the frame is output to the output unit 131, the frame undergoes the same process as that in the normal mode and is transmitted through the output port to the destination computer, for example. On the other hand, the frame destined to the output port of the output unit 132 that is the stopped output unit has output port information indicating the frame is destined to the output port of the stopped output unit. However, the frame is not output to the output unit 132 that is the stopped output unit but is output to the output unit 131 that is the common output unit.

After the frame destined to the output port of the output unit 132 is output to the output unit 131 that is the common output unit and before the frame is stored to the output buffer 1312, the frame is processed by the same processes as those on the frame destined to the output port of the output unit 131.

However, since the multiplexer 1315 is set to only output a frame destined to the output port of the output unit 131, a frame with the output port information indicating that the frame is destined to the output port of the output unit 132 is not output from the multiplexer 1315. On the other hand, the output buffer 1312 is connected to the multiplexer 1325, and the multiplexer 1325 is set to only output a frame destined to the output port of the output unit 132. Thus, a frame having the output port information indicating that the frame is destined to the output port of the output unit 132 is output from the multiplexer 1325. Then, the frame undergoes processing in the output frame post-processing portion 1323 and is transmitted by the output interface portion 1326 through the output port, not depicted, to the destination computer, for example. In this way, the frame is properly output to the destination port.

Here, the output unit 131 is described as the common output unit and the output unit 132 is described as the stopped output unit; however the output unit 131 may be the stopped output unit, and the output unit 132 may be the common output unit.

In this way, the power saving is achieved even in the configuration having the multiplexer between the output buffer and the output frame post-processing portion without the use of the adjustment buffer. The configuration may have the adjustment buffer and multiplexer between the output frame pre-processing portion and the output buffer. In this case, the power-saving is achieved by stopping the supply of power or a clock signal to the output frame pre-processing portion and adjustment buffer. According to the comparison between FIG. 5 and FIG. 6, providing the adjustment buffer and multiplexer near the output port allows stopping the supply of power or a clock signal to more circuits, resulting in a higher power-saving effect.

With reference to FIGS. 2 to 6, two configurations of the input units and output units have been described up to this point. However, the configuration of the input units and the configuration of the output units may be combined arbitrarily. For example, the first configuration of the input units may be combined with the first configuration of the output units. Alternatively, the first configuration of the input units may be combined with the second configuration of the output units. One of the input units or one of the output units may be turned to the power-saving mode, or both the input and output units may be turned to the power-saving mode for further reduction in power consumption.

With the configurations above, even when the circuit that stops the supply of power or a clock signal fails, for example, the circuit in another input unit or output unit in the same group may be shared, without using the circuit in the failed part. Thus, the data processing may be performed without problems.

Next, with reference to FIG. 7 to FIG. 10, details of the processing to be performed in the network switch 100 in order to shift to the power-saving mode will be described. Notably, when the network switch 100 is powered on or when a computer or the like is newly connected to a port of the network switch 100, the processing as will be described below may be performed.

Figure 7:
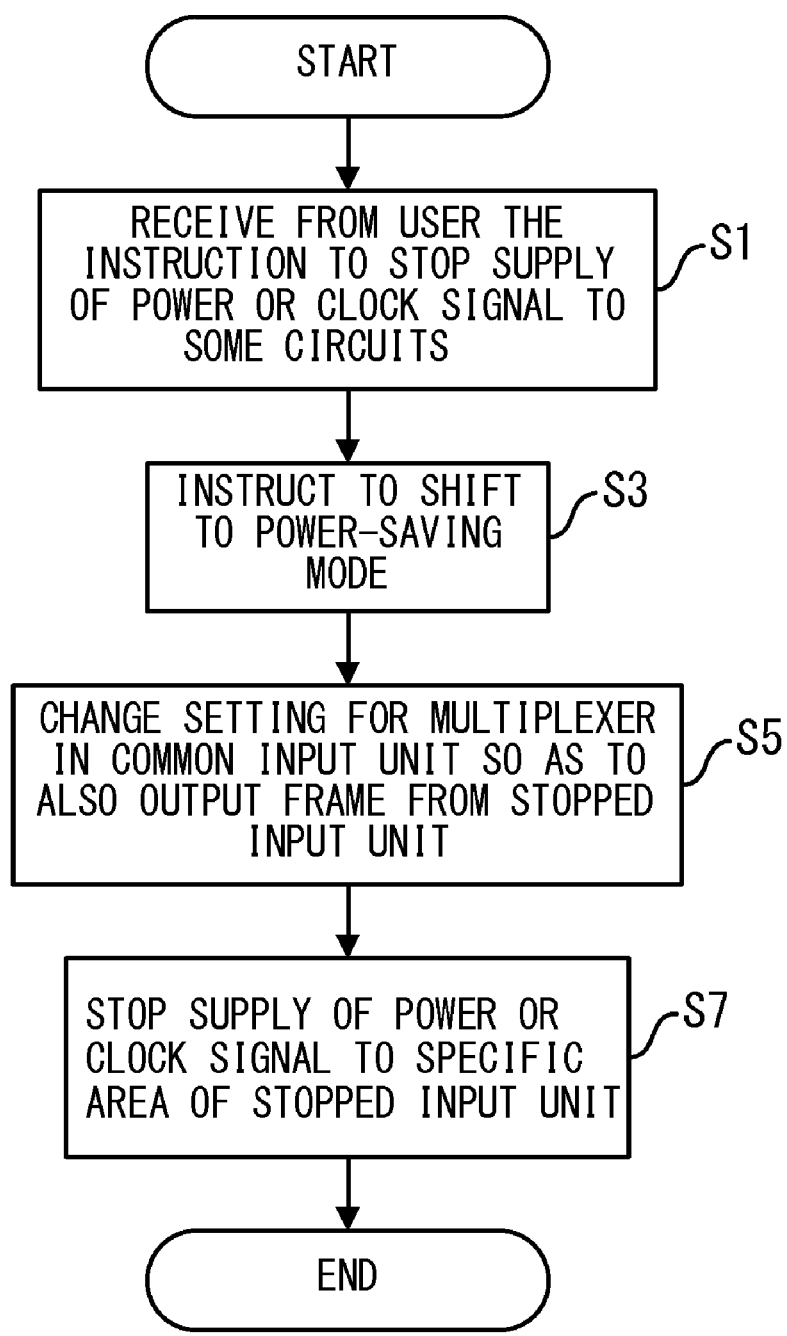
FIG. 7 is a diagram depicting a processing flow by the input unit.

With reference to FIG. 7, the processing will first be described which is to be performed for shifting an input unit to the power-saving mode in response to an instruction from a user. The following description assumes that the input unit has the configuration depicted in FIG. 2. First of all, the network switch control unit 101 in the network switch 100 receives an instruction to stop the supply of power or a clock signal to some of the circuits (FIG. 7/step S1). A user may operate a terminal (not depicted) connected to the network switch 100 to learn the transmission rates to and from computers, for example, connected to the ports. As described above, the input unit operates in accordance with the transmission rate to and from a computer, for example, connected to the port. For example, when the input units 121 and 122 are able to support a transmission rate of 10 Gbps but the actual transmission rates are 1 Gbps, a user may determine to shift to the power-saving mode. It is assumed here that the terminal of the user instructs the network switch control unit 101 to handle the input unit 121 as the common input unit and the input unit 122 as the stopped input unit. In this case, it may be considered that the working speed of the input unit 121 is approximately the same as that when the transmission rate to and from a computer, for example, connected to the port is 2 Gbps. However, the input unit 121 may support a transmission rate of up to 10 Gbps, so there are no problems.

Next, the network switch control unit 101 instructs the input control portion 1217 that is the common input unit and the input control portion 1227 that is the stopped input unit to shift to the power-saving mode (step S3).

Then, the input control portion 1217 in the input unit 121 receives the instruction from the network switch control unit 101 and changes the setting for the multiplexer 1213 (step S5). Here, the setting for the multiplexer 1213 is changed so as to output not only a frame from the adjustment buffer 1212 in the common input unit but also a frame from the adjustment buffer 1222 in the stopped input unit.

Then, the input control portion 1227 in the input unit 122 receives the instruction from the network switch control unit 101 and stops the supply of power or a clock signal to the circuits in a specific part of the stopped input unit (step S7). In this case, the supply of power or a clock signal to the multiplexer 1223, input frame pre-processing portion 1224, input buffer 1225, and input frame post-processing portion 1226 is stopped.

Performing the processing above allows the reduction of power consumption in the input unit in accordance with the determination by the user managing the network switch. Furthermore, the processing capability by the input unit to the network switch may be used effectively.

Figure 8:
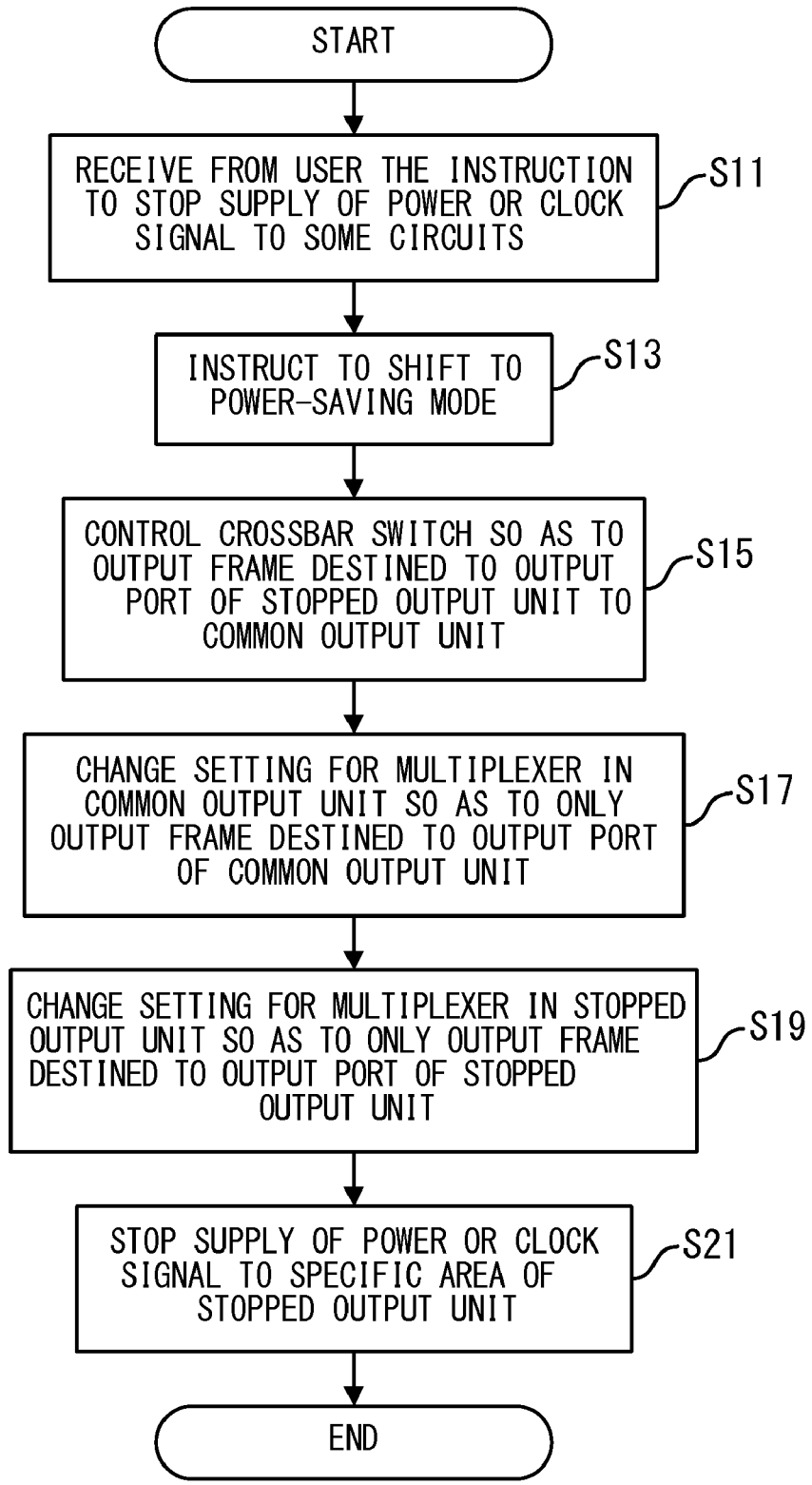
FIG. 8 is a diagram depicting a processing flow by the output unit.

Next, with reference to FIG. 8, processing will be described which is to be performed for shifting an output unit to the power-saving mode in response to an instruction from a user. The following description assumes that the output unit has the configuration depicted in FIG. 5. First of all, the network switch control unit 101 in the network switch 100 receives an instruction to stop the supply of power or a clock signal to some of the circuits (FIG. 8, step S11). As described on step S1, the user grasps the transmission rates to and from computers or the like connected to the ports and determines whether to shift to the power-saving mode or not. Here, the user determines to shift to the power-saving mode and instructs the network switch control unit 101 through a terminal to handle the output unit 131 as the common output unit and handle the output unit 132 as the stopped output unit.

Next, the network switch control unit 101 instructs the crossbar switch control unit 111, the output control portion 1317 that is the common output unit, and the output control portion 1327 that is the stopped output unit to shift to the power-saving mode (step S13).

Then, the crossbar switch control unit 111 in the crossbar switch 110 receives the instruction from the network switch control unit 101 and controls the crossbar switch 110 so as to output a frame destined to the output port of the output unit 132 that is the stopped output unit to the output unit 131 that is the common output unit (step S15).

Then, the output control portion 1317 in the output unit 131 receives the instruction from the network switch control unit 101 and changes the setting for the multiplexer 1315 (step S17). Here, the setting for the multiplexer 1315 is changed so as to only output a frame having output port information indicating the frame is destined to the output port of the output unit 131. The output control portion 1327 of the output unit 132 receives an instruction from the network switch control unit 101 and changes the setting for the multiplexer 1325 (step S19). Here, the setting for the multiplexer 1325 is changed so as to only output a frame having output port information indicating that the frame is destined to the output port of the output unit 132. Notably, the multiplexer 1315 and 1325 are set to only output a frame destined to the output ports of output units 131 and 132, unless the settings are changed. So, step S17 and step S19 are performed for confirmation. Thus, if changing the settings is not required in step S17 and step S19, the processing may be skipped.

Then, the output control portion 1327 in the output unit 132 receives the instruction from the network switch control unit 101 and stops the supply of power or a clock signal to a circuit in a specific part of the stopped output unit (step S21). Here, the supply of power or a clock signal to the output frame pre-processing portion 1311, output buffer 1312, output frame post-processing portion 1323, and adjustment buffer 1314 is stopped.

Performing the processing as described above allows the reduction in power consumption in the output unit in accordance with the determination by the user managing the network switch. Furthermore, the processing capability by the output unit from the network switch may be used effectively.

Figure 9:
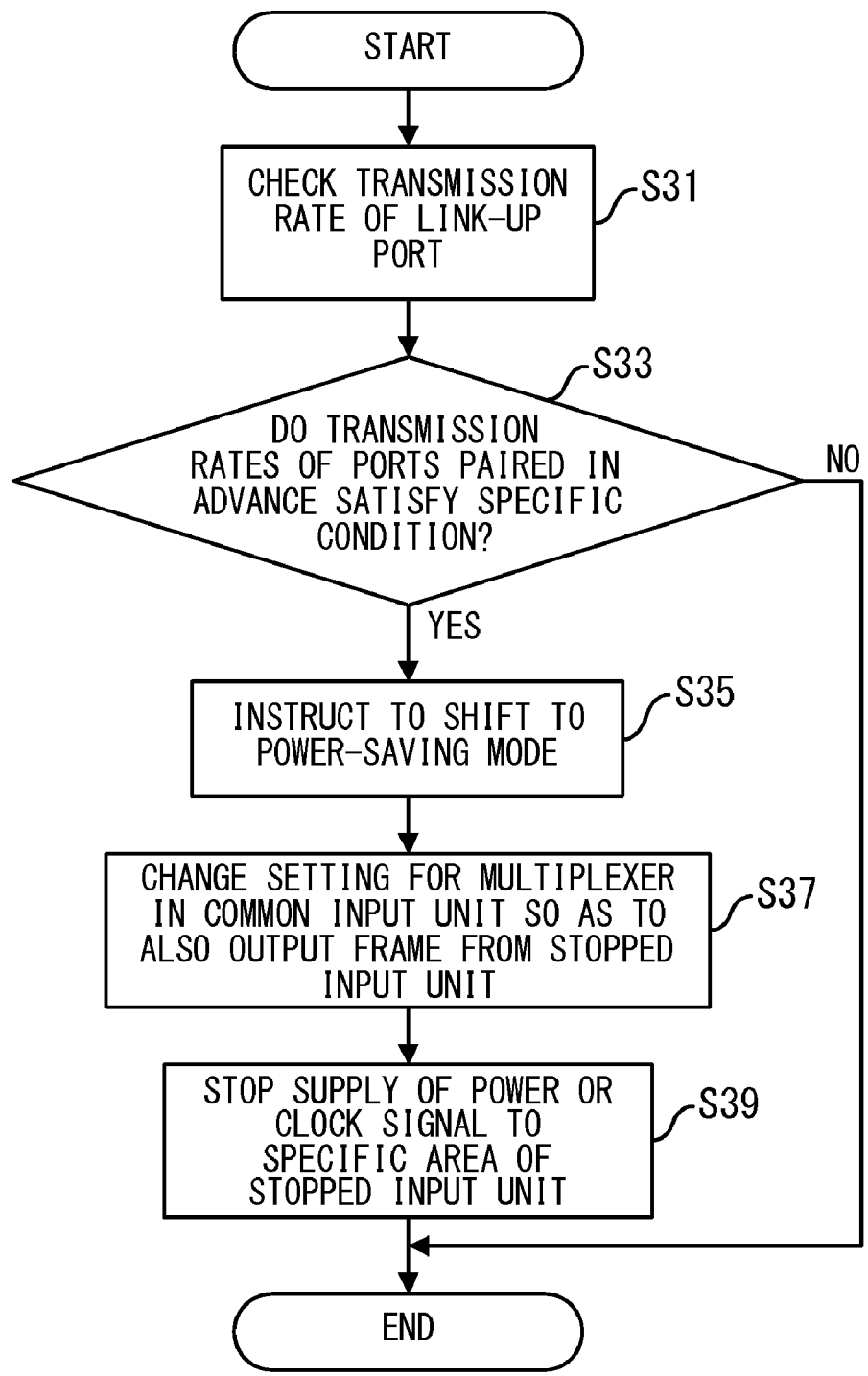
FIG. 9 is a diagram depicting a processing flow by the input unit.

Next, with reference to FIG. 9, the processing will be described for shifting an input unit to the power-saving mode without reception of an instruction from a user. The following description assumes that the input unit has the configuration depicted in FIG. 2. First of all, the network switch control unit 101 in the network switch 100 checks the transmission rate between a link-up port and a computer, for example, to be connected (step S31). Then, whether the transmission rates of two ports paired in advance satisfy a specific condition or not is determined (step S33). The specific condition here may be a condition that the total of the transmission rates of two ports is sufficiently lower than the transmission rate supported by an input unit. If it is determined that the specific condition is not satisfied (step S33: No), the processing ends.

Notably, in step S33, for example, a pair of neighboring ports may be determined in advance, and whether the pair satisfies a specific condition or not may be determined. Ports that are not neighboring may be paired, or three or more ports may be combined into a set instead of a pair. Alternatively, a specific combination may not be determined in advance, but, before performing step S33, a plurality of ports may be arbitrarily identified from link-up ports, and whether the identified ports satisfy a specific condition or not may be determined. However, the kinds of combinations depend on the implementation in hardware.

On the other hand, if it is determined that the specific condition is satisfied (step S33: Yes), the network switch control unit 101 instructs the input control portion 1217 and input control portion 1227 to shift to the power-saving mode (step S35). Since the transmission rates of the ports of the input units 121 and 122 satisfy the specific condition here, the network switch control unit 101 determines that the input unit 121 is to be handled as the common input unit and the input unit 122 as the stopped input unit for the instruction. Notably, the input unit may be determined randomly between the common input unit and the stopped input unit. The determination may follow a predetermined method. For example, the input unit having a smaller port number may be handled as the common input unit.

Then, the input control portion 1217 receives the instruction from the network switch control unit 101 and changes the setting for the multiplexer 1213 (step S37). In this case, the setting may be changed such that the multiplexer 1213 may output not only a frame from the adjustment buffer 1212 in the common input unit, but also a frame from the adjustment buffer 1222 in the stopped input unit.

Then, the input control portion 1227 in the stopped input unit receives the instruction from the network switch control unit 101 and stops the supply of power or a clock signal to a circuit in a specific part of the stopped input unit (step S39). In this case, the supply of power or a clock signal to the multiplexer 1223, the input frame pre-processing portion 1224, the input buffer 1225, and the input frame post-processing portion 1226 is stopped.

Performing the processing as described above allows the reduction in power consumption in the input units even without reception of the instruction from a user. Furthermore, the processing capability by the input unit in the network switch may be used effectively.

Figure 10:
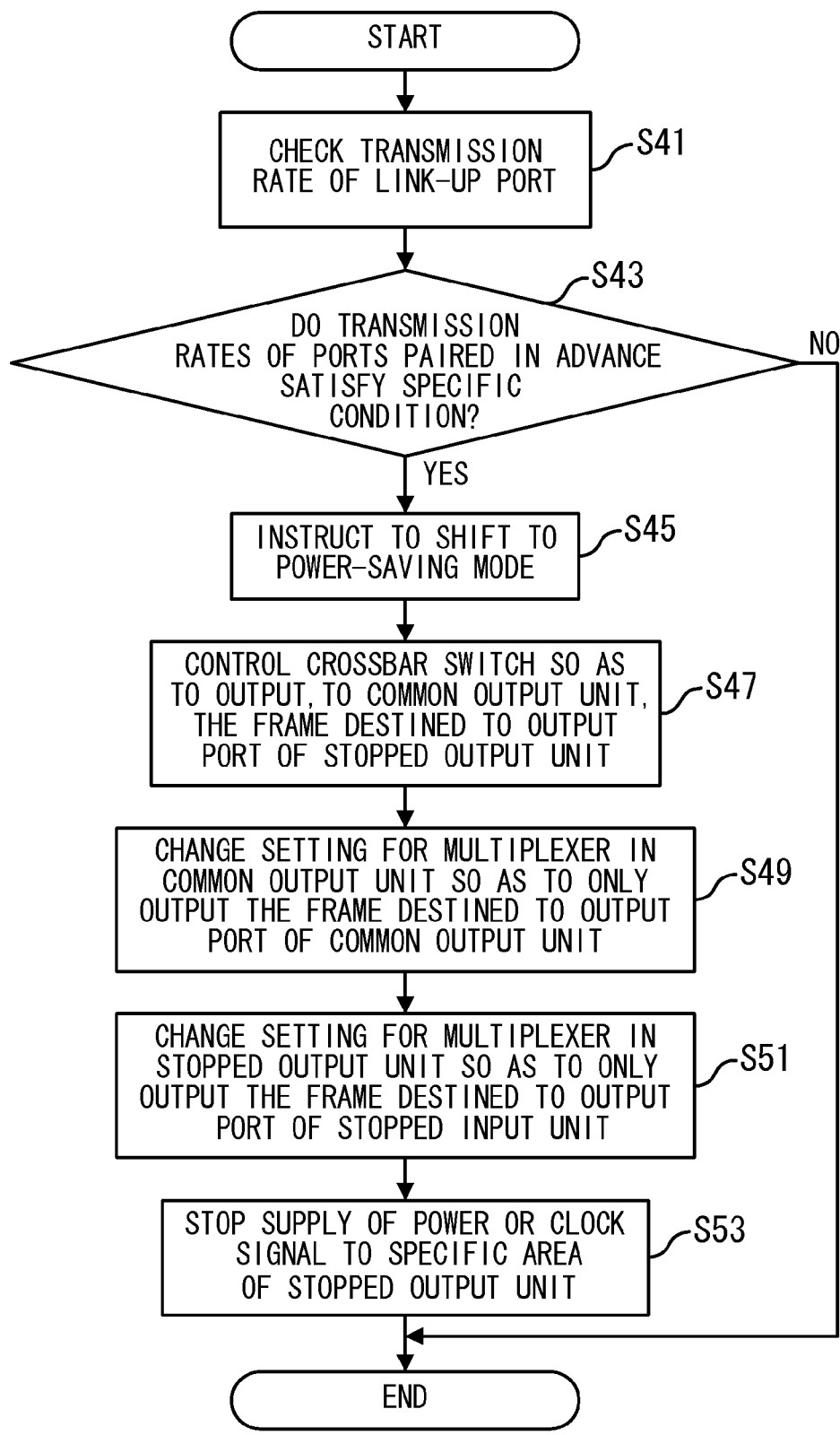
FIG. 10 is a diagram depicting a processing flow by the output unit.

Next, with reference to FIG. 10, the processing will be described for shifting an output unit to the power-saving mode without reception of an instruction from a user. The following description assumes that the output unit has the configuration depicted in FIG. 5. First of all, the network switch control unit 101 in the network switch 100 checks the transmission rates between link-up ports and computers, for example, to be connected (step S41). Then, whether the transmission rates of two ports paired in advance satisfy a specific condition or not is determined (step S43). The specific condition here may be a condition that the total of the transmission rates of two ports is sufficiently lower than the transmission rate supported by an output unit. If it is determined that the specific condition is not satisfied (step S43: No), the processing ends.

Notably, in step S43, for example, a pair of neighboring ports may be determined in advance, and whether the pair satisfies a specific condition or not may be determined. Ports that are not neighboring may be paired, or three or more ports may be combined into a set, instead of a pair. Alternatively, a specific combination may not be determined in advance, but, before performing step S43, a plurality of ports may be arbitrarily identified from link-up ports, and whether the identified ports satisfy a specific condition or not may be determined. However, the kinds of combinations depend on the implementation in hardware.

On the other hand, if it is determined that the specific condition is satisfied (step S43: Yes), the network switch control unit 101 instructs the crossbar switch control unit 111, output control portion 1317 and output control portion 1327 to shift to the power-saving mode (step S45). Since the transmission rates of the ports of the output units 131 and 132 satisfy the specific condition here, the network switch control unit 101 determines that the output unit 131 is to be handled as the common output unit and the input unit 132 as the stop input unit for the instruction. Notably, the input unit may be determined randomly between the common output unit and the stopped output unit. The determination may follow a predetermined method. For example, the output unit having a smaller port number may be handled as the common output unit.

Then, the crossbar switch control unit 111 in the crossbar switch 110 receives the instruction from the network switch control unit 101 and controls the crossbar switch 110 so as to output a frame destined to the output port of the output unit 132 that is the stopped output unit to the output unit 131 that is the common output unit (step S47).

Then, the output control portion 1317 in the output unit 131 receives the instruction from the network switch control unit 101 and changes the setting for the multiplexer 1315 (step S49). Here, the setting for the multiplexer 1315 is changed so as to only output a frame having the output port information indicating that the frame is destined to the output port of the output unit 131. The output control portion 1327 in the output unit 132 receives the instruction from the network switch control unit 101 and changes the setting for the multiplexer 1325 (step S51). Here, the setting for the multiplexer 1325 is changed so as to only output a frame having output port information indicating the frame is destined to the output port of the output unit 132. Notably, the multiplexer 1315 and 1325 are set to only output frames destined to the output ports of output units 131 and 132, unless the settings are changed. So, step S49 and step S51 are performed for confirmation. Thus, if changing the settings is not required in step S49 and step S51, the processing may be skipped.

Then, the output control portion 1327 in the output unit 132 receives the instruction from the network switch control unit 101 and stops the supply of power or a clock signal to a circuit in a specific part of the stop output unit (step S53). Here, the supply of power or a clock signal to the output frame pre-processing portion 1321, output buffer 1322, output frame post-processing portion 1323, and adjustment buffer 1324 is stopped.

Performing the processing as described above allows the reduction in power consumption in the output unit without reception of the instruction from a user. Furthermore, the processing capability by the output unit from the network switch may be used effectively.

Having described the embodiments of the present technology, the present technology is not limited thereto. For example, in FIG. 2 and FIG. 3, an input control portion is provided in each input unit. However, for example, one input control portion may be provided to the network switch, or one input control portion may be provided to a group of associated input units. Then, the input control portion may control the input units. The same is true for the output control portion.

The present technology is applicable to not only network switches but also network apparatuses such as network hubs and line cards.

The power consumption may be reduced not only by stopping the supply of a clock signal but also by lowering the frequency of the clock signal.

The embodiment of present technology may be summarized as follows:

A network apparatus according to a first aspect of the present technology includes a plurality of input units, a plurality of output units, a switching unit outputting data input from the input unit to the output unit relating to the apparatus to which the data is to be output; and an input control unit. An input unit included in a same group among the plurality of input units has a buffer storing data received from another apparatus, a multiplexer connected to the buffer and the output from the buffer in another input unit in the same group and being capable of selectively outputting data input from the buffer and the buffer in the other input unit in the same group, and an input data processing portion connected to the output of the multiplexer and performing specific input data processing on data input from the multiplexer and then outputting the data after the specific input data processing to the switching unit. The input control unit controls the selection of the data output in the multiplexer and controls the supply of power or a clock signal to the multiplexer and the input data processing portion.

With the configuration, received data may be processed by the corresponding input unit as is, or received data may be processed by another input unit having a reserve processing capacity in the same group. In this way, for example, the operations may be switched in accordance with the communication speed to and from the device or apparatus to be connected. Particularly, it is not necessary to operate the multiplexer and input data processing portion in the corresponding input unit. Thus, the input control unit may stop the supply of power or a clock signal, which may reduce the power consumption. Notably, the configuration of the group may have various forms. The group may be configured by neighboring input units or by three or more input units.

The input control unit in response to an instruction to shift to a power-saving mode may control the selection of the data output by the multiplexer in one input unit in the same group so as to switch and output data input from the buffers in the input units in the same group and may stop the supply of power or a clock signal to the multiplexers and input data processing portions in the remaining input units in the same group. For example, when a total of transmission rates of the input units in the same group and other apparatuses is sufficiently lower than the transmission rate supported by the input units, the shift to the power-saving mode may be instructed. Thus, the operations as described above may be performed, and the power consumption may thus be reduced.

The network apparatus may further include an output control unit, wherein the switching unit may add data input from the input unit output destination information indicating the output unit connected to the apparatus to which the data is to be output. An output unit included in a same group among the plural output units has a first output data processing portion performing first output data processing on data input from the switching unit and then outputting the data after the first output data processing, a buffer connected to the output of the first output data processing portion and storing data input from the first output data processing portion, a multiplexer connected to the buffer and the output from the buffer in another output unit in the same group and outputting data having output destination information indicating the data is to be output to a specific output unit among data input from the buffer and the buffer in the other output unit in the same group, and a second output data processing portion connected to the output of the multiplexer and performing second output data processing on data input from the multiplexer and then transmitting the data after the second output data processing to the destination apparatus of the data. The output control unit may control the supply of power or a clock signal to the first output data processing portion and the buffer.

With the configuration, transmitted data may be processed by the corresponding output unit as is, or transmitted data may be processed by another output unit having a reserve processing capacity in the same group. In this way, for example, like the input units, the operations may be switched in accordance with the communication speed to and from the device or apparatus to be connected. Particularly, it is not necessary to operate the first output data processing portion and buffer in the corresponding output unit. Thus, the output control unit may stop the supply of power or a clock signal, which may further reduce the power consumption. Notably, the configuration of the group may have various forms. The group may be configured by neighboring output units or by three or more output units.

In response to an instruction to shift to the power-saving mode, the output control unit may stop the supply of power or a clock signal to the first output data processing portion and the buffer in the output units excluding a specific output unit in the same group, and the switching unit may output, to the specific output unit, the data destined to the output unit in which the supply of power or a clock signal to the first output data processing portion and the buffer has been stopped. For example, when a total of transmission rates between the output units in the same group and other apparatuses is sufficiently lower than the transmission rate supported by the output units, the shift to the power-saving mode may be instructed. Thus, the operations as described above may be performed, and the power consumption may thus be reduced.

A network apparatus according to a second aspect of the present technology includes a plurality of input units, a plurality of output units, a switching unit adding data input from the input unit output destination information indicating the output unit connected to the apparatus to which the data is to be output and outputting the data having the output destination information to the output unit connected to the apparatus to which the data is to be output or another output unit in the same group as that of the output unit, and an output control unit. An output unit included in the same group among the a plurality of output units has a first output data processing portion performing first output data processing on data input from the switching unit and then outputting the data after the first output data processing, a buffer connected to the output of the first output data processing portion and storing data input from the first output data processing portion, a multiplexer connected to the buffer and the output from the buffer in another output unit in the same group and outputting data having output destination information indicating the data is to be output to its output unit among data input from the buffer and the buffer in the other output unit in the same group, and a second output data processing portion connected to the output of the multiplexer and performing second output data processing on data input from the multiplexer and then transmitting the data after the second output data processing to the destination apparatus of the data, and the output control unit controls the supply of power or a clock signal to the first output data processing portion and the buffer.

With the configuration, transmitted data may be processed by the corresponding output unit as is, or transmitted data may be processed by another output unit having a reserve processing capacity in the same group. In this way, for example, like the input units, the operations may be switched in accordance with the communication speed to and from the device or apparatus to be connected. Particularly, it is not necessary to operate the first output data processing portion and buffer in the corresponding output unit. Thus, the output control unit may stop the supply of power or a clock signal, which may reduce the power consumption. Notably, the configuration of the group may have various forms. The group may be configured by neighboring output units or by three or more output units.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment of the present invention has been described in detail, it should be understood that the various changes, substitutions, and alterations could be made hereto without departing from the spirit and scope of the invention.

The invention claimed is:

1. An apparatus comprising:
   a plurality of input units;
   a plurality of output units;
   a switching unit to output data input from an input unit to an output unit relating to a destination apparatus to which the data is to be output; and
   an input control unit, wherein input units included in a same group among the plurality of input units each have:
      an input buffer;
      an adjustment buffer to store data received from another apparatus;
      a multiplexer connected to the input buffer thereof and to the input buffer in another input unit in a same group, and selectively outputting data input from the input buffer thereof and from the input buffer in the other input unit in the same group; and
      an input data processing portion connected to the multiplexer, the input data processing portion performing specific input data processing on data input from the multiplexer and outputting data after the specific input data processing to the switching unit,
   wherein the input control unit controls a data output selection of the multiplexer and controls supply of power or supply of a clock signal to the multiplexer and the input data processing portion.

2. The apparatus according to claim 1, wherein the input control unit, in response to an instruction to shift to a power-saving mode, controls the selection of the data output by the multiplexer in one input unit in the same group so as to switch and output data input from the buffers in each of the input units in the same group, and stops the supply of power or the supply of a clock signal to the multiplexers and input data processing portions in remaining input units in the same group.

3. The apparatus according to claim 1,
   further comprising an output control unit,
   wherein the switching unit adds, to data input from the input unit, output destination information indicating an output unit connected to the apparatus to which the data is to be output; and
   wherein output units included in a same group among the plurality of output units each have:
      a first output data processing portion performing first output data processing on data input from the switching unit, and outputting the data after the first output data processing;
      a buffer connected to the output of the first output data processing portion, and storing data input from the first output data processing portion;
      a multiplexer connected to an output of the buffer and to the output of a buffer in another output unit in the same group, and outputting data indicating that an output unit indicated by the added output destination information is the multiplexer's own output unit; and
      a second output data processing portion connected to the output of the multiplexer and performing second output data processing on data input from the multiplexer, and transmitting the data, after the second output data processing, to the destination apparatus of the data;
   wherein the output control unit controls the supply of power or the supply of a clock signal to the first output data processing portion and the buffer.

4. The apparatus according to claim 3, wherein in response to an instruction to shift to the power-saving mode, the output control unit stops the supply of power or the supply of the clock signal to the first output data processing portion and the buffer in the output units excluding a specific output unit in the same group; and wherein the switching unit outputs, to the specific output unit, the data indicating that the output destination is the output unit in which the supply of power or the supply of the clock signal to the buffer and the first output data processing portion has been stopped.

5. An apparatus comprising:

a plurality of input units;

a plurality of output units;

a switching unit adding, to data input from the input unit, output destination information indicating the output unit connected to the apparatus to which the data is to be output, and outputting the data having the output destination information to the output unit connected to the apparatus to which the data is to be output, or to another output unit in the same group as that of the output unit; and an output control unit, wherein output units included in the same group among the plurality of output units each have:
- a first output data processing portion performing first output data processing on data input from the switching unit, and outputting the data after the first output data processing;
- an output buffer connected to the output of the first output data processing portion and storing data input from the first output data processing portion;
- a multiplexer connected to an output from the buffer and an output from a buffer in another output unit in the same group, and outputting data indicating that an output unit specified by output destination information is the multiplexer's own output unit; and
- a second output data processing portion connected to the output of the multiplexer and performing second output data processing on data input from the multiplexer and transmitting the data after the second output data processing to the destination apparatus of the data;

wherein the output control unit controls the supply of power or the supply of the clock signal to the first output data processing portion and the buffer.

* * * * *